United States Patent [19]

Larky et al.

[11] Patent Number: 4,956,638

[45] Date of Patent: Sep. 11, 1990

[54] DISPLAY USING ORDERED DITHER

[75] Inventors: Steven P. Larky, Austin, Tex.; Bruce D. Lucas, Yorktown Heights, N.Y.; Daniel H. McCabe, Chapel Hill, N.C.; Todd K. Rodgers, Chappaqua, N.Y.

[73] Assignee: International Business Machines Corporation, Armonk, N.Y.

[21] Appl. No.: 245,857

[22] Filed: Sep. 16, 1988

[51] Int. Cl.⁵ .............................................. G09G 5/02
[52] U.S. Cl. ................................... 340/701; 340/703; 340/793; 358/457
[58] Field of Search ............... 340/701, 703, 726, 771, 340/793; 358/13, 21, 133, 240, 429, 455, 456, 457, 458, 459

[56] References Cited

U.S. PATENT DOCUMENTS

| | | | |
|---|---|---|---|
| 3,925,609 | 12/1975 | Ninke | 340/771 |
| 3,967,052 | 6/1976 | Judice | 358/240 |
| 4,266,249 | 5/1981 | Chai et al. | 358/133 |
| 4,652,905 | 3/1987 | Lippel | 358/13 |
| 4,663,662 | 5/1987 | Sekizawa et al. | 358/457 |
| 4,682,216 | 7/1987 | Sasaki et al. | 358/457 |
| 4,683,466 | 7/1987 | Holtey et al. | 340/703 |
| 4,698,690 | 10/1987 | Tanioka | 358/457 |
| 4,709,274 | 11/1987 | Tanioka | 358/457 |
| 4,723,173 | 2/1988 | Tanioka | 358/457 |
| 4,730,185 | 3/1988 | Springer et al. | 340/703 |

*Primary Examiner*—Alvin E. Oberley
*Assistant Examiner*—Richard A. Hjerpe
*Attorney, Agent, or Firm*—Jack M. Arnold

[57] ABSTRACT

A color display device which includes dither apparatus for each primary color to be displayed. A dither matrix provides a dither signal output as a function of the position of a pixel on the color display device. An input primary color signal includes an integer signal and a fraction signal. The integer signal is incremented by an incrementer. There is means for providing an output primary color signal which is the incremented signal whenever a predetermined relationship exists between the dither signal and the fraction signal, and which is the integer signal whenever the predetermined relationship does not exist.

6 Claims, 7 Drawing Sheets

| Y Addr | X Address Least Significant Bits | | | |
|---|---|---|---|---|
| Least Significant Bits | 00 | 01 | 10 | 11 |
| 00 | 0 | 8 | 2 | A |
| 01 | C | 4 | E | 6 |
| 10 | 3 | B | 1 | 9 |
| 11 | F | 7 | D | 5 |

FIG. 6

| Desired Input Color | 3 * input / 255 (4 Shades) | | 7 * input / 255 (8 Shades) | |
|---|---|---|---|---|
| | Integer | Fraction | Integer | Fraction |
| 0 | 0 | 0 | 0 | 0 |
| 1 | 0 | 0 | 0 | 0 |
| 2 | 0 | 0 | 0 | 0 |
| 3 | 0 | 0 | 0 | 1 |
| 4 | 0 | 0 | 0 | 1 |
| 5 | 0 | 0 | 0 | 2 |
| 6 | 0 | 1 | 0 | 2 |
| 7 | 0 | 1 | 0 | 3 |
| ... | ... | ... | ... | ... |
| 84 | 1 | 8 | 3 | 9 |
| 85 | 1 | 9 | 3 | A |
| 86 | 1 | 9 | 3 | A |
| 87 | 1 | 9 | 3 | B |
| ... | ... | ... | ... | ... |
| FB | 2 | F | 6 | E |
| FC | 2 | F | 6 | E |
| FD | 2 | F | 6 | F |
| FE | 2 | F | 6 | F |
| FF | 3 | 0 | 7 | 0 |

FIG. 7

| Y Addr | Least Significant Bits | X Address Least Significant Bits | | | | | | | |
|---|---|---|---|---|---|---|---|---|---|
| | | 00 | | 01 | | 10 | | 11 | |
| 00 R,G,B | | 4 | 1 2 | 4 | 0 2 | 4 | 0 2 | 4 | 0 1 |
| Pixel Value | | 86 | | 82 | | 82 | | 81 | |
| 01 R,G,B | | 3 | 0 1 | 4 | 0 2 | 3 | 0 1 | 4 | 0 2 |
| Pixel Value | | 61 | | 82 | | 61 | | 82 | |
| 10 R,G,B | | 4 | 0 2 | 3 | 0 1 | 4 | 1 2 | 4 | 0 1 |
| Pixel Value | | 82 | | 61 | | 86 | | 81 | |
| 11 R,G,B | | 3 | 0 1 | 4 | 0 2 | 3 | 0 1 | 4 | 0 2 |
| Pixel Value | | 61 | | 82 | | 61 | | 82 | |

FIG. 9

| Shade | Palette Value | | | |
|---|---|---|---|---|
| | 4 Shades | | 8 Shades | |
| | Decimal | Hex | Decimal | Hex |
| 000 | 0 | 0 | 0 | 0 |
| 001 | 85 | 55 | 36 | 24 |
| 010 | 170 | AA | 73 | 49 |
| 011 | 255 | FF | 109 | 6D |
| 100 | | | 146 | 92 |
| 101 | | | 182 | B6 |
| 110 | | | 219 | DB |
| 111 | | | 255 | FF |

DISPLAY USING ORDERED DITHER

1. TECHNICAL FIELD

The invention is in the field of display devices, and specifically is directed to allowing a far larger number of colors than normal to be displayed on a color display device by the use of ordered dither and lookup table color selection.

2. BACKGROUND ART

The number of bits allocated to a pixel on a raster scan display determines the number of different colors that can be simultaneously displayed. For an all-points-addressable (APA) display, there is physical memory allocated to each pixel. A 1024 by 1024 display with eight bits of memory allocated per pixel requires 1 Megabyte of memory for the display buffer, allowing 256 different colors to be simultaneously displayed. It is common to pass the eight-bit pixel value through a lookup table (or palette) before driving the CRT screen. The lookup table typically allows the selection of one of 256 different 24-bit values representing 16 million different colors.

One method of producing the effect of relative color intensity utilizes "dither" patterns, including dots of one color interspersed with dots of another in a correct ratio to form the desired shade. For example, to achieve a mixture of two primaries such as red and yellow, dots of red may be interlaced with dots of yellow, wherein the interlaced arrangement comprises the dither pattern. If there are appreciable numbers of dots or pixels in an area being colored, and if the resulting hard copy is viewed at any distance, the eye combines the colors of the dither pattern to achieve the effect of the desired shade.

The management of the color image including the "rasterizing" of data to supply the individual dots or pixels is usually under the control of a microprocessor. According to the conventional approach, the processor directs the production of each pixel at each particular location on a display device, and the processor looks up the color information in a table in order to determine what color each pixel should be in order to write the overall dither pattern.

In an article entitled "Using Ordered Dithers to Display Continuous Tone Pictures on an AC Plasma Panel", Proc. SID, Fourth Quarter 1974, pp. 161-169; by J. N. Judice et al. A scheme for ordered dither is described. Grey scale images are converted to a single bit per pixel output.

The following patents are extensions of the Judice et al article as they extend the grey scale dither to color dither. Essentially, these patents take a 24-bit color and break it into independent 8-bit red, green and blue components or their complements cyan, magenta and yellow, and sometimes black. These 8-bit images are then converted into 1-bit images via an ordered dither technique as in Judice et al. There is no teaching of converting the 8-bit image into a more than 1-bit image.

U.S. Pat. No. 4,730,185 to Springer et al, sets forth a color display system in which color dither patterns are read into a pixel bit map memory used to form a color display by means of concurrently addressing a pattern memory storing the dither patterns. Lower order address bit repeatedly access a preselected portion of the pattern memory to supply the dither pattern which is written as data into the pixel bit map memory.

U.S. Pat. No. 4,683,466 to Holtey et al, describes a color display graphics system which includes three bit map memories for storing bits representing red, green and blue colors respectively. Combinations of bits from the same address locations of each bit map memory display a pixel which could be any one of eight colors: black, blue, green, cyan, red, magenta, yellow or white. A read only memory (ROM) stores patterns made up of sixteen bits in a four-by-four matrix for each of the red, green and blue colors. The 16-bit matrices are stored in their respective bit map memories for subsequent color display. Combinations of matrices may be used to show shades of the above eight colors and the mixing of any of those shades.

In an article entitled "New Dithering Technique For Realistic Color Image Synthesis on Binary RGB Displays"; Proc. SPIE Int. Soc. Opt. Eng. (USA) Vol. 638 2986 pp. 123-137; by R.J. Gove, a technique similar to those set forth in Judice et al are described. Specifically, a new technique for the displaying of continuous tone color pictures on a bi-level, tri primary display or a display with limited numbers of colors displayable is investigated. The significance of this technique is that it can provide pleasing and realistic images on standard, low cost, RGB graphic display, which is in abundant use in the personal computer community. Specific hardware has been constructed to acquire images from a video camera and generate these images on several personal computer color graphic system monitors. The time to process the digitized 24-plane, RGB image into the dithered 3-plane, RGB image is less than one second.

According to the present invention, dithering is utilized to display a far larger number of colors without increasing the size of the display buffer. This is accomplished through ordered dither and lookup table color selection.

BRIEF DESCRIPTION OF THE DRAWING

FIG. 6 is a table representative of the lookup table shown generally in FIG. 4;

FIG. 7 is a table representative of results using dither apparatus;

FIG. 9 is a table representative of palette values.

DISCLOSURE OF THE INVENTION

In a color display device, there is a dither apparatus for each primary color. A dither matrix provides a dither signal as a function of the position of a pixel on the display. A lookup table stores a set of colors and responds to a color select signal to provide an integer signal output and a fractional signal output. The integer signal is incremented by an incrementer to provide an incremented signal. A comparator compares the dither signal with the fractional signal for providing a color select signal if the dither signal is greater than the fractional signal. The incremented signal is selected as the output primary color signal if the color select signal is provided, otherwise the integer signal is selected as the output primary color signal.

DESCRIPTION OF THE PREFERRED EMBODIMENT

This invention employs a technique called dithering to display a far larger number of colors without increasing the size of the display buffer. Dithering utilizes a pattern of two colors close to the desired color that, when averaged by the eye, appears to be the desired color. The colors in the lookup table are specially chosen to be used in the dither process. This invention describes hardware that causes the correct color to be stored in the display buffer to achieve the dither effect.

A dither algorithm operates on each primary (Red, Green, Blue) separately. A circuit is described that computes the correct pixel value for one such primary and describes how the result of three such operations (for each of Red, Green, and Blue) can be combined. All eight bits of the frame buffer are reserved for the dithered image, with three bits of the eight used for Red, three bits for Green and two bits for Blue (the eye is less sensitive to blue). This allows eight independent values for Red, eight for Green and four for Blue.

Figure 1:
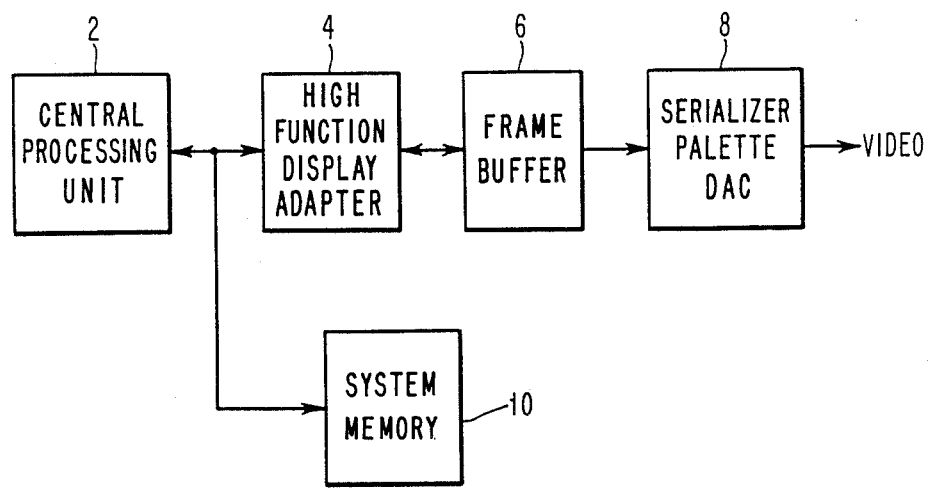
FIG. 1 is a block diagram of a display using ordered dither.

FIG. 1 is a block diagram of a typical workstation with high speed graphic drawing capabilities. A Central Processing Unit 2, sends commands to a High Function Display Adapter 4. The high function display adapter 4 reads and writes pixels to a frame buffer 6. The frame buffer 6 also interfaces to a serializer palette digital to analog converter, (DAC) 8 that transforms digital pixels into analog video to be displayed on a raster-scan display. The central processing unit 2 also has access to a system memory 10 for storing instructions and data. The high function display adapter 4 provides the interface to the frame buffer 6 allowing high speed graphic functions such as line draw and bitblt. The frame buffer 6 is organized as a number of planes, with the number of planes determining the number of simultaneous different colors that can be shown on the screen.

Figure 2:
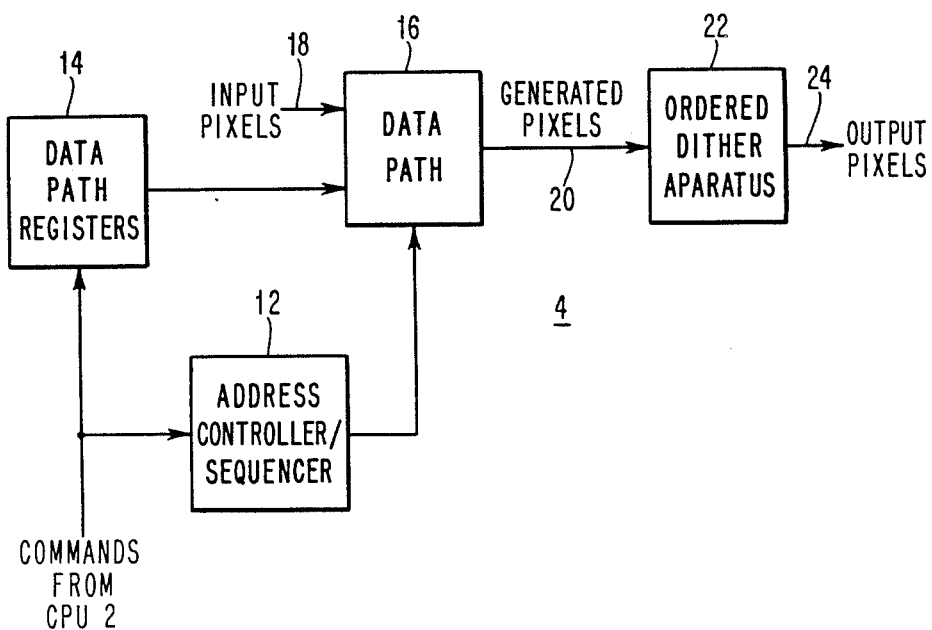
FIG. 2 is a detailed block diagram of the high function display adapter shown generally in FIG. 1.

FIG. 2 is a more detailed diagram of the high function display adapter 4 of FIG. 1. Commands from the CPU 2 of FIG. 1 are fed to an address controller/sequencer 12 and data path registers 14. The data path registers 14 contain values for line endpoints, initial color values, and other values required for high speed display manipulation tasks. The address controller/sequencer 12 generates the pixel address for line draw, bitblt, and other functions. The data path registers 14 and input pixels 18 containing the current bitmap information are applied to a data path circuit (16) for generation of a sequence of pixels 20. These pixels 20 are the result of various operations such as logical operations between the input pixels 18 and internally generated pixels from the data path registers 14. For example, the internally generated pixels may be linear interpolations between values in the data path registers 14. The generated pixels 20 are at full calculated resolution (for example, 24-bits per pixel). These pixels 20 are passed through the ordered dither apparatus 22 which generates output pixels 24 at the frame buffer pixel size (bits per pixel) for application to the frame buffer 6 (FIG. 1).

Figures 3, 5:
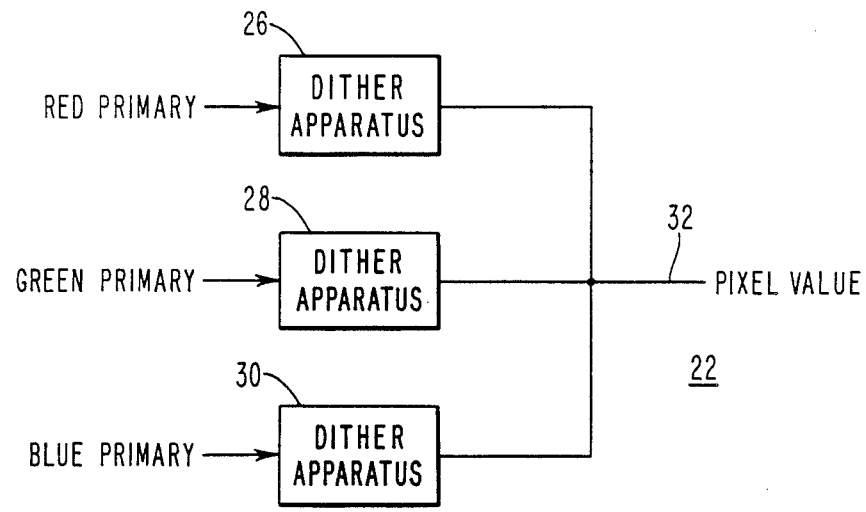
FIG. 3 is a detailed block diagram of the ordered dither apparatus which is shown generally in FIG. 2.
FIG. 5 is a table representation of the dither matrix shown generally in FIG. 4.

FIG. 3 is a detailed block diagram of the ordered dither apparatus 22 of FIG. 2. There are three dither apparatus 26, 28 and 30 which receive the red primary, green primary and blue primary, respectively and operate to provide a final pixel value at 32.

Figure 4:
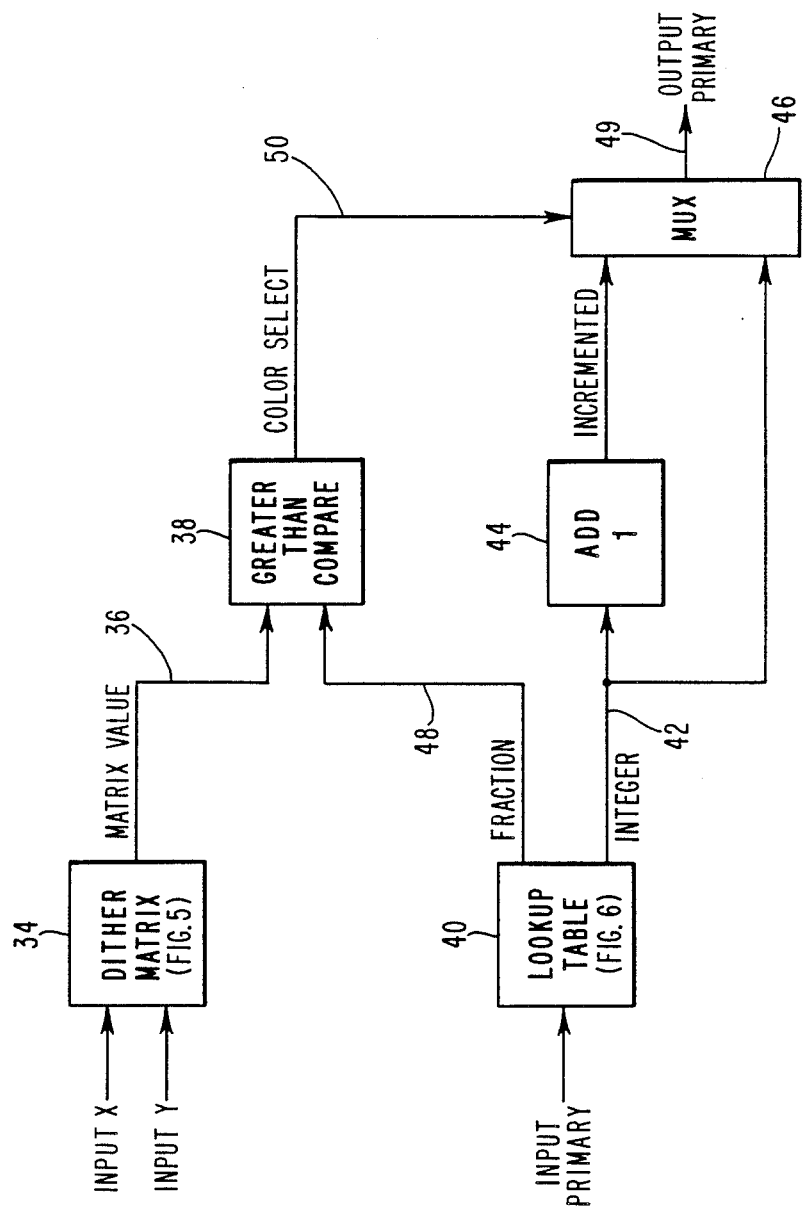
FIG. 4 is a detailed block diagram of the dither apparatus for one primary color, which is shown generally in FIG. 3 for each of the three primary colors.

The three dither apparatus 26, 28 and 30 are identical, and a representative dither apparatus for one such primary is shown in FIG. 4. The dither apparatus includes a dither matrix 34 which has an input x and input y, the x and y parameters of a given pixel, and in response thereto provides a dither matrix value output on line 36 to a compare network 38. The operation of the dither matrix 34 is explained in detail relative to FIG. 5.

A lookup table 40 is used to map an input primary color to various shades. The output of the lookup table 4 is comprised of an integer signal 42 which is applied to an incrementer 44, which adds 1 to the integer value, and to a multiplexor 46. A fraction signal 48 from table 40 is applied to the comparator 38. The incremented signal from incrementer 44 is also applied to the multiplexor 46. The comparator 38 compares the dither signal 36 from dither matrix 34 with the fraction signal 48 from lookup table 40 to provide a color select signal 50 whenever a predetermined relationship exists between the dither signal 36 and the fraction signal 48. For example, if the fraction signal 48 is greater than the dither signal 36 the incremented signal from incrementer 44 is selected as the output primary on line 49, or conversely if the fraction signal is less than or equal to the integer signal, the integer signal on line 42 is selected as the output primary on line 49 by the multiplexer 46.

A more detailed and mathematical description of the dithering process generally described above follows. Throughout the following, the notation of the C programming language for hexidecimal numbers is used. In C, hex numbers are preceded by "0x". Thus, 16 is 0×10 in hex.

The basic concept behind multi-bit ordered dither is a mapping from input intensities to hardware index outputs. The lowest input intensity (0) is mapped into the lowest hardware index (also 0). Furthermore, it is desired to map the maximum intensity (in the examples $(2^8-1)=255$) is mapped into the maximum hardware index. In a 2 bit system, the maximum index is 3 $(=2^2-1)$; in a 3 bit system, the maximum index is 7 $(=2^3-1)$. (All subsequent examples are for 3 bit systems).

Mapping is performed by multiplying the input by the maximum output value and then dividing that product by the maximum input. Thus, $$0 = (I \times 7)/255,$$

where I is the input intensity and 0 is the output hardware index.

Notice that this mapping loses precision. Precision can be increased by multiplying the input by a constant then dividing the result by that same constant.

$I1 = I \times K,$
$01 = (I1 \times 7)/255,$
$0 = 01/K.$

The constants cancel each other out.

A particularly suitable choice for K is 16, which is a power of 2. Multiplication by 16 is simply a 4 bit shift to the left in software and padding four 0 bits at the least significant end in hardware.

Similarly, division by 16 is simply a 4 bit shift to the right in software and removing the least significant 4 bits in hardware. When using K=16, the least significant 4 bits of 01 can be interpreted as a fraction. Specifically, 01 MOD 16 is the fraction that the value of 01 is between $0 \times K$ and $(0+1) \times K$.

In this embodiment, the relationship between I and 01 is realized as a lookup table. The least significant 4 bits are the fraction. The most significant 3 bits are the hardware output index, which possibly gets incremented.

01 MOD 16 (the fractional error of 0) can be used in the dither process. If 01 MOD 16 is greater than D2 (x MOD 4, y MOD 4), then 01 is rounded up to 0+1. If 01 MOD 16 is less than D2(x MOD 4, y MOD 4), then 01 is rounded down to 0. D2 is the 4×4 dither matrix, which contains the values 0..15.

The above is embodied as a multiplexor, i.e., the comparison result switches between 0 and 0+1. An alternative embodiment dispenses with the multiplexor by simply adding D2 to 01 and then shifting the least significant bits away. This latter approach is a simpler for a software realization. However, the multiplexor approach is better for hardware, because it reduces the total gate delay time.

Consider the following example:
I=128 (i.e., half intensity)
$I \times K = 128 \times 16 = 2048$
$I \times K \times 7 = 14336$
$01 = I \times K \times 7 / 255 = 56 = 0 \times 38$
$O = 01/16 = 3$
1 MOD 16 = 8

Thus, I=128 maps to half way between hardware indices 3 and 4 (8 is half way between 0 and 16). Examining the dither matrix:

| — | | | | | — |
|---|---|---|---|---|---|
| : | 0 | 8 | 2 | 10 | : |
| : | 12 | 4 | 14 | 6 | : |
| : | 3 | 11 | 1 | 9 | : |
| : | 15 | 7 | 13 | 5 | : |
| — | | | | | — |

Rounding up (+) and down (−) is as follows:

| — | | | | | — |
|---|---|---|---|---|---|
| : | + | − | + | − | : |
| : | − | + | − | + | : |
| : | + | − | + | − | : |
| : | − | + | − | + | : |
| — | | | | | — |

The result is that alternating "3" and "4" pixels are written.

Color images are processed by separating the 24 bit pixel value into three 8 bit primary intensities (red, green, and blue). If the frame buffer hardware has 8 bits per pixel, 3 of those bits are allocated for the red field, 3 bits for green and 2 bits for blue. The calculations are performed independently in each primary (i.e., 0..255 in red is converted to 0..7 for the red field, etc.). The final results are combined into the 8 bit pixel.

A representative dither matrix 34 is shown in detail in FIG. 5 utilizing hexadecimal notation. If the Y address applied to the matrix is 10 and the X address is 11, the matrix value 9 is selected to be compared with the fraction signal 48 from lookup table 40, as described above. Other matrix values are calculated in a like manner.

The dither matrix can vary in size, a larger matrix permitting a greater number of colors to be simulated (a large matrix has more possibilities for the ratio of one color to another). If the matrix is too large, however, then the eye will be unable to average the colors over the large area, and the benefits of a more precise color ratio are lost. Utilizing a 4 by 4 dither matrix as shown, allows 1/16th of the difference between the two closest colors to be the smallest incremental color change.

A representative lookup table 40 (FIG. 4) is shown in detail in FIG. 6, utilizing hexadecimal notation. The lookup table 40 is used to map the desired (input) color to the shades available in the lookup table. The input color is mapped to the available palette entries. The fractional difference between the desired color and the palette entry is then compared to the value in the dither matrix to determine whether to use the palette entry that is lower (darker) than the desired color or the palette entry that is higher (brighter) than the desired color. The incoming color is passed through a lookup table which generates an integer result representing the lower palette entry and a fractional result (on a scale of 0 to 15 to correspond to a 16 entry dither matrix) for use with the dither matrix. This fractional result is then compared to the dither matrix entry for the pixel and if the fractional value is less than or equal to the dither matrix entry then the lower value is selected, otherwise 1 is added to the integer result and that value is stored in the frame buffer. Some example entries are shown in the lookup table. The formula for the lookup table entry is: desired * maxvalue/255. This maps the lowest input value to 0 and the highest (assuming an 8-bit desired color input) to the maxvalue. In the current example, maxvalue is 7 for Red and Green and 3 for Blue.

An example is now set forth to better understand the invention. Assume for this example that the input color is Red=87 (hex), Green=6 (hex), and Blue=87 (hex). Red maps to 3 integer, and B fraction, Green maps to 0 integer and 2 fraction, while Blue maps to 1 integer and 9 fraction. The fraction is used to compare to the entry in the dither matrix which has the same X Y as the pixel location. If, for this example, the two least significant bits of X are 11 and the two least significant bits of Y are 10, the dither matrix entry is 9. Then the Red pixel color is 4 (B >9), Green is 0 (2 <=9), and Blue is 1 (9 <=9). These are then combined as an 8-bit pixel value of 81 (hex) (10000001 binary). The palette entry for 81 is R=92 (hex), G=00 (hex), B=55 (hex). The pixel value of 81 (hex) is only valid for X=11 (binary), Y=10 (binary). If a larger region of color Red=87 (hex), Green=6 (hex), and Blue=87 (hex) is used, then the matrix entries will dither the pixel values as shown in FIG. 7.

The use of dither increases the color resolution over the resolution that would be normally gained from 8-bits per pixel. The dither matrix generates 16 different combinations of the integer value and one plus the integer value. This increases the color resolution by 4 bits for each primary, independently. Thus, the resulting color resolution is the pixel value resolution (typically 8 bits) plus the increase of 12 bits (4 bits times 3 primaries) resulting from the dither process. For typical implementations, the color resolution is increased from 8-bits to 20-bits, a close approximation of the input 24-bit value. This scheme achieves over one million perceivable colors as opposed to the 256 colors normally displayable with an 8-bit per pixel display.

Alternative color mappings are also compatible with the dither method described herein. Other possibilities include a 2-4-2 (R-G-B) mapping, allowing 16 shades of Green but only 4 shades of Red and Blue. This split in the colors might be chosen because the eye is most sensitive in the green portion of the spectrum.

Figure 8:
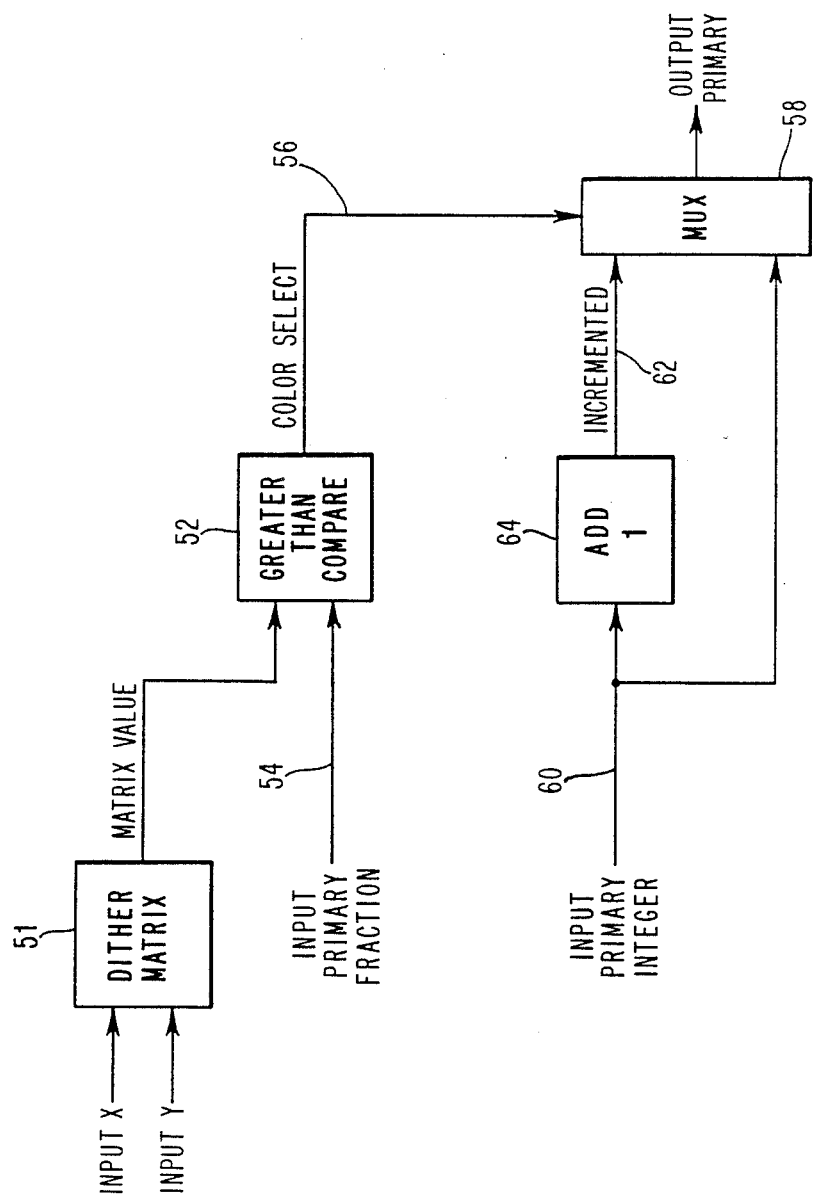
FIG. 8 is an alternative block diagram of the dither apparatus shown generally in FIG. 4.

If the number of gates in the lookup table 40 of FIG. 4 is prohibitive, an alternative embodiment shown in FIG. 8 eliminates the lookup table 40. In that case, the colors must be calculated based on the fixed point integer and fraction that normally is generated by the lookup table. For a 3D shading engine, this may be quite acceptable, as the only change is that each primary is multiplied by 7/255 (or 3/255 in the case of Blue). Many algorithms that compute the color on an incremental basis simply need to adjust the initial color by 7/255 and the incremental color change by 7/255. A dither matrix 51 feeds a greater than compare 52 which compares the matrix value with an input primary fraction 54 to generate a color select signal 56. The color select signal 56 controls multiplexor 58 to choose between an input primary integer value signal 60 and its incremented value 62, generated by an incrementer 64.

Palette values for initial palette selection as applied from the frame buffer 6 to the serializer palette DAC 8 of FIG. 1, are shown in FIG. 9. For each palette location a value for the Red, Green, and Blue output is set independently. One common representation is for the first three bits in the eight bit palette index to represent the value of the Red output, the next three bits then represent the value of the Green output, and the last two bits represent the value of the Blue output. The contents of the palette at each index are then set so that any index value will contain the appropriate red, green and blue contributions. For example, the palette contents for index 177, binary 10110001 (RRRGGGBB), are the values for Red equals 5, Green equals 4, and Blue equals 1. The Red palette value will be B6 (hex), the Green palette value will be 92 (hex) and the Blue palette value will be 55 (hex). The 4 or 8 shades available for each primary are selected to be evenly spaced from the minimum palette output value (typically 0) to the maximum palette output value (typically 255). Thus, the serialize palette DAC 8 (FIG. 1) converts the digital palette entries to analog signals suitable to drive a color display device.

INDUSTRIAL APPLICABILITY

It is an object of the invention to provide an improved color display device utilizing ordered dither.

It is another object of the invention to provide an improved color display device utilizing ordered dither for generating a pattern of two colors close to a desired color such that the average color as perceived by a user is the desired color.

It is a further object of the invention to provide an improved color display device utilizing ordered dither, wherein the dithered pattern is produced utilizing a lookup table, a dither matrix, a comparator and a multiplexor.

It is yet another object of the invention to provide an improved color display device utilizing ordered dither, wherein the dithered pattern is produced by truncating a value generated from the desired color and its position on the screen of the display device.

It is yet a further object of the invention to provide an improved color display device utilizing ordered dither wherein a lookup table is used to pre-store a set of colors that are used with the dithering function.

We claim:

1. A dither apparatus for each primary color to be displayed on a color display device, comprising:
   a dither matrix which provides a dither signal output as a function of the position of a pixel on said color display device;
   a lookup table which stores a set of colors and responds to a color select signal to provide an integer signal output and a fractional signal output;
   an incrementer which increments said integer signal to provide an incremented signal; and
   means for providing a primary color signal which is said incremented signal whenever a predetermined relationship exist between said dither signal and said fractional signal, and which is said integer signal whenever said predetermined relationship does not exist.

2. A dither apparatus for each primary color to be displayed on a color display device, comprising:
   a dither matrix which provides a dither signal output as a function of the position of a pixel on said color display device;
   a lookup table which stores a set of colors and responds to a color select signal to provide an integer signal output and a fractional signal output;
   an incrementer which increments said integer signal to provide an incremented signal; and
   means for providing a primary color signal which is said incremented signal whenever said dither signal is greater than said fractional signal, and which is said integer signal whenever said dither signal is not greater than said fractional signal.

3. The combination claimed in claim 2, wherein said means for providing a primary color signal comprises:
   a multiplexor which has a first input of said incremented signal and a second input of said integer signal, and a select input for selecting said incremented signal when a select signal is applied thereto, and selecting said integer signal in the absence of said select signal; and
   a comparator for comparing said dither signal with said fractional signal, for providing said select signal to said multiplexor whenever said dither signal is greater than said fractional signal.

4. A dither apparatus for each primary color to be displayed on a color display device, comprising:
   a dither matrix which provides a dither signal output as a function of the position of a pixel on said color display device;
   an input primary color signal which includes an integer signal and a fraction signal;
   an incrementer which increments said integer signal to provide an incremented signal; and
   means for providing an output primary color signal which is said incremented signal whenever a predetermined relationship exists between said dither signal and said fraction signal, and which is said integer signal whenever said predetermined relationship does not exist.

5. A dither apparatus for each primary color to be displayed on a color display device, comprising:
   a dither matrix which provides a dither signal output as a function of the position of a pixel on said color display device;
   an input primary integer signal;
   an input primary fraction signal;
   an incrementer which increments said integer signal to provide an incremented signal; and
   means for providing an output primary color signal which is said incremented signal whenever said dither signal is greater than said fraction signal, and which is said integer signal whenever said dither signal is not greater than said fraction signal.

6. The combination claimed in claim 5, wherein said means for providing an output primary color signal comprises:

a comparator for providing a color select signal in response to comparing said dither signal and said fraction signal and finding said dither signal to be greater than said fraction signal; and an output means which has a first input of said incremented signal and a second input of said integer signal, and a select input to which said color select signal is provided, with said incremented signal being selected as said output primary color signal when said color select signal is applied to said select input, with said integer signal being selected as said output primary signal when said color select signal is not applied to said select input.

* * * * *